United States Patent [19]
Bushman et al.

[11] Patent Number: 4,900,876
[45] Date of Patent: Feb. 13, 1990

[54] POWDER EMITTING ANIMAL COLLAR AND METHOD OF MAKING

[75] Inventors: Donald W. Bushman; Marissa A. Klapwald; John W. Mikkonen, all of County of Racine, Wis.

[73] Assignee: S. C. Johnson & Son, Inc., Racine, Wis.

[21] Appl. No.: 217,734

[22] Filed: Jul. 11, 1988

[51] Int. Cl.$^4$ .............................................. A01K 27/00
[52] U.S. Cl. .................................... 119/106; 119/156
[58] Field of Search ....................... 119/106, 156, 159; 128/876, DIG. 15; 40/633

[56] References Cited

U.S. PATENT DOCUMENTS

| | | | |
|---|---|---|---|
| 254,156 | 2/1882 | Ricker et al. | 119/106 |
| 1,127,249 | 2/1915 | Hughes | 119/106 |
| 2,205,711 | 6/1940 | Banks | 119/156 X |
| 2,349,713 | 5/1944 | Finch | 119/106 |
| 2,401,253 | 5/1946 | Lamb, Jr. | 119/106 |
| 2,586,761 | 2/1952 | Eskola | 119/159 |
| 2,734,483 | 2/1956 | Peo | 119/156 X |
| 2,762,158 | 9/1956 | Duffey | 424/412 X |
| 2,791,202 | 5/1957 | Doyle | 119/156 X |
| 2,808,030 | 10/1957 | Costanzo | 119/106 |
| 3,477,409 | 11/1969 | Costanzo | 119/106 |
| 3,811,413 | 5/1974 | Scherpenborg | 119/156 X |
| 3,814,061 | 6/1974 | Aries et al. | 119/106 |
| 3,904,746 | 9/1975 | Aries | 424/28 |
| 3,935,839 | 2/1976 | Goodwin | 119/156 |
| 4,031,859 | 6/1977 | Stewart | 119/106 |
| 4,047,505 | 9/1977 | McAndless | 119/156 X |
| 4,068,624 | 1/1978 | Ramney | 119/156 X |
| 4,150,109 | 4/1979 | Dick et al. | 119/156 X |
| 4,208,986 | 6/1980 | Costanzo | 119/106 |
| 4,273,130 | 6/1981 | Simpson | 128/DIG. 15 X |
| 4,338,886 | 7/1982 | McBride | 119/156 X |
| 4,350,122 | 9/1982 | Shotwell | 119/156 X |
| 4,495,898 | 1/1985 | Akhavein et al. | 119/156 |
| 4,505,889 | 3/1985 | Amick | 424/411 |
| 4,506,630 | 3/1985 | Hair | 119/156 |
| 4,666,767 | 5/1987 | Von Kohorn et al. | 43/111 X |
| 4,671,960 | 6/1987 | Thielen et al. | 424/195.1 |

FOREIGN PATENT DOCUMENTS 2529054  12/1983  France ................. 119/106

Primary Examiner—Robert P. Swiatek

[57] ABSTRACT

An animal collar made from a unitary or single piece of flexible sheet material having a plurality of compartments for containing and controllably emitting a powdered material is disclosed. The emission of the powdered material is through a plurality of pores formed in one or more walls of each compartment. The powdered material contained within the collar can be any material which is suitable for distribution on the hair and/or skin of an animal, such as an insecticidal, medicinal, animal grooming or the like composition.

29 Claims, 2 Drawing Sheets

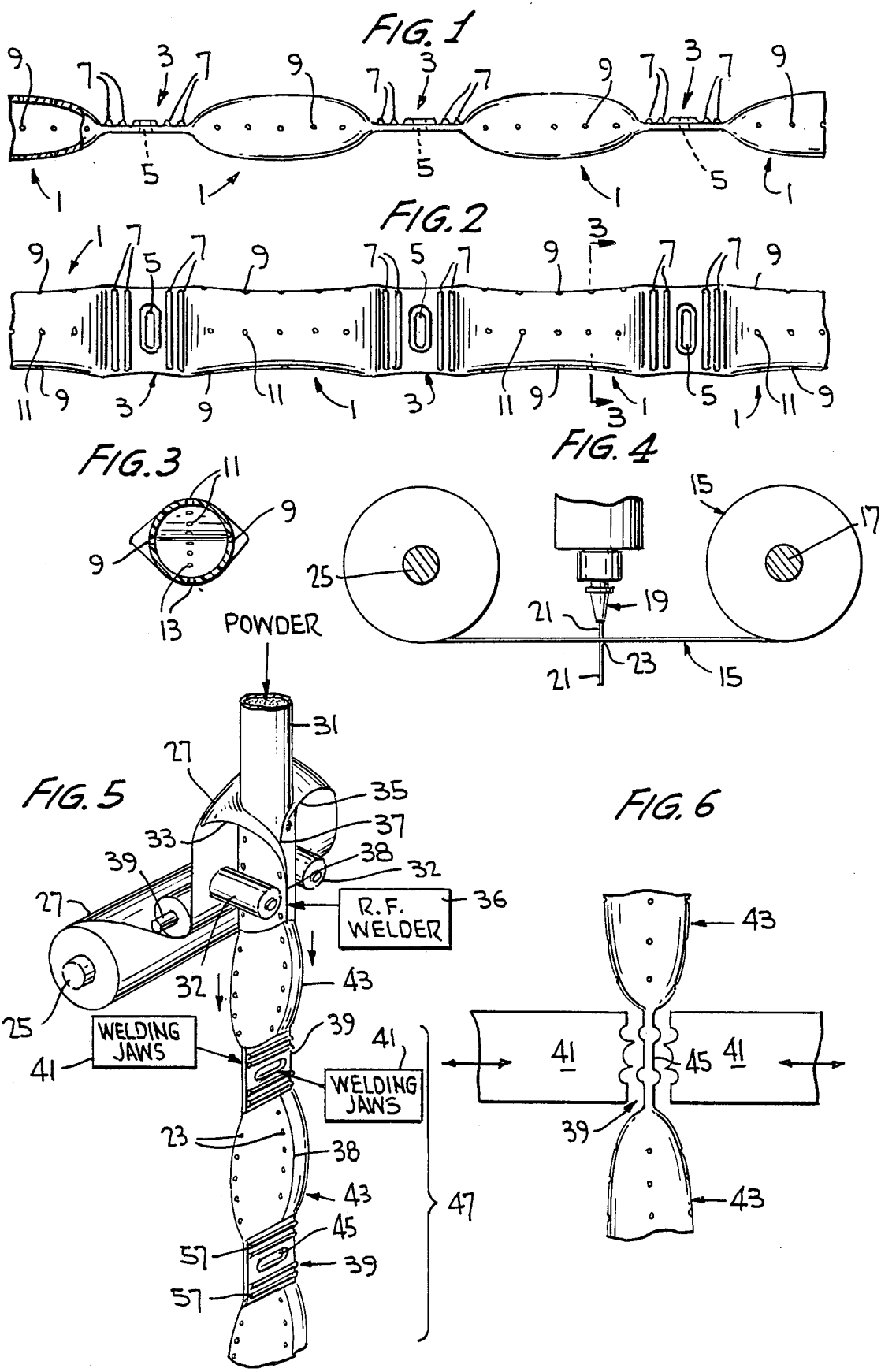

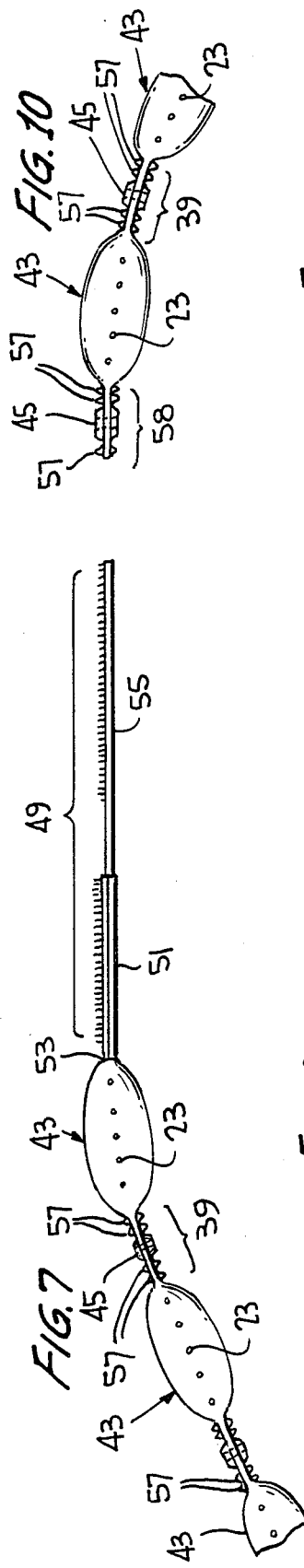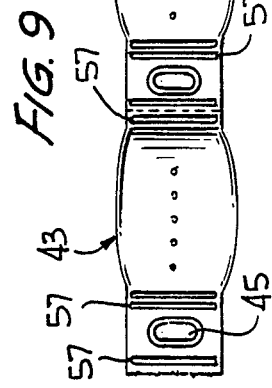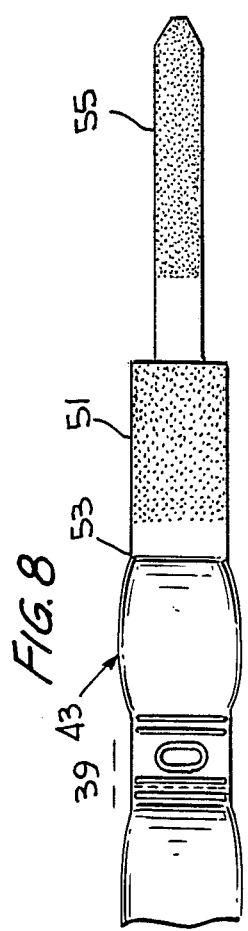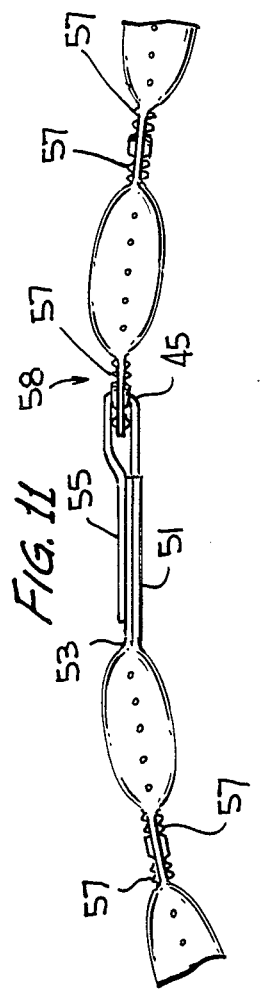

POWDER EMITTING ANIMAL COLLAR AND METHOD OF MAKING

FIELD OF THE INVENTION

The present invention is directed to an animal collar having a plurality of compartments made from a unitary or single piece of flexible sheet material for containing and controllably emitting a powdered material. The rate of emission is controlled by a combination of a plurality of pores formed in the collar's sidewalls, the diameter of those pores, the positioning of the pores, and the flexibility of the material used to make the collar. The powdered material contained within the collar can be any particulate material suitable for distribution on an animal's hair and/or skin, such as an insecticidal, medicinal, grooming or the like particulate composition. A preferred particulate composition is a powdered material containing a flea and/or tick repellent or like parasiticide.

BACKGROUND OF THE INVENTION

The prior art discloses various animal collars which are described as releasing a substance over a period of time onto the body of an animal. The material released is generally either a vapor emitted from a solid material or a powder dispensed from a particular collar structure. Collars for dispensing powders necessarily utilize some form of compartment for holding the powder to be dispensed. U.S. Pat. Nos. 254,156; 2,342,066; 2,349,713; 2,401,253; 2,734,483; and 3,904,746 disclose examples of powder dispensing animal collars.

The prior art devices, however, do not controllably emit an amount of powder which effectively covers the entire animal as provided by the present invention. Further, the prior art devices do not emit an effective amount of powdered material over substantially the entire body surface of an animal for a predetermined extended period of time as provided by the present invention.

OBJECTS OF THE INVENTION

One of the objects of the present invention is to provide a compartmented animal collar for holding a powdered material and controllably emitting or releasing an effective amount of powdered material from the collar onto the animal for a predetermined extended period of time.

A further object of the present invention is to provide a compartmented animal collar for controllably emitting a powdered material utilizing a plurality of pores or holes in the collar side wall(s).

Yet another object of the present invention is to provide a compartmented animal collar for holding and emitting a powdered material, wherein the compartmented animal collar is made from a single or unitary piece of flexible sheet material.

A further object of the present invention is to provide a compartmented animal collar for holding and controllably emitting a powdered material which is disposable.

A still further object of the present invention is to provide a method of making the above-described animal collar.

BRIEF SUMMARY OF THE INVENTION

Briefly stated, the animal collar of the present invention comprises a plurality of hollow sections or compartments which are suitable for holding a powdered material. The hollow compartments each preferably have a plurality of pores or holes formed in the side walls thereof. The pores are spaced and dimensioned in an appropriate manner so as to provide for the emission of a predetermined amount of the powdered material from the collar compartments for an extended period of time. The period of time is limited only by the volume and number of compartments in the collar.

The collar is made from a flexible or elastic sheet material. The normal movement of the animal on which the collar is placed causes the collar to flex forcing the powdered material held within the collar to move out of the collar compartments through the pores in the compartment walls. The powdered material is then deposited onto the animal's skin and/or hair. The thus deposited powdered material will move along the hair shafts of the animal's coat due to overlapping of the hair shafts and relative movement of the hair shafts. The flexibility or elasticity of the sheet material thus utilized to form the collar is, accordingly, a factor in determining the rate of emission of the powdered material.

A presently preferred method of making the animal collar utilizes a single sheet of flexible material having a number of pores drilled through the material. The parallel longitudinal side edges of the sheet material are caused to overlap forming a tube-like structure. The overlapping edges are then longitudinally sealed forming a seam. A cross seal is formed across the width of the continuous tube-like structure. Following the formation of each cross seal, a metered amount of powdered material is poured into each hollow section formed so that the next cross seal made results in a closed powdered material-containing compartment. The steps of forming a cross seal and filling the tube-like structure with a powdered material are alternated thereby resulting in a plurality of connected powdered material containing compartments. These compartments make up the collar of the present invention. The pores formed in the sheet material are preferably laser drilled providing for an efficient and controllable emission of the powdered material from the collar due to the smoothness of the pore walls.

BRIEF DESCRIPTION OF THE DRAWINGS

The foregoing, as well as other objects, features and advantages of the present invention, will become readily understood upon reading the following detailed description of the illustrated embodiments, together with reference to the drawing figures, wherein:

FIG. 1 is a partially fragmented side view, partially in section, of one presently preferred embodiment of the animal collar of the invention.

FIG. 2 is a top planar view of the collar of FIG. 1.

FIG. 3 is a cross-sectional view taken along line 3—3 of FIG. 2.

FIG. 4 is an edge view disclosing one presently preferred method of forming pores or holes in a sheet of flexible material by laser drilling.

FIG. 5 is a partially fragmented perspective view disclosing one presently preferred method of forming a plurality of hollow connected compartments in an animal collar and the filling of those compartments with a powdered material.

FIG. 6 is a partially fragmented edge view disclosing one presently preferred method of forming a cross seal during the making of the animal collar, including the formation of an opening in the center of the cross seal.

FIG. 7 is a partially fragmented edge view of one presently preferred fastening means for attachment to one terminal end of the animal collar of the invention.

FIG. 8 is a top planar view of the fastening means shown in FIG. 7.

FIG. 9 is a top planar view of an animal collar having a plurality of compartments, disclosing openings located between the compartments which are suitable for receiving the fastening means shown in FIGS. 7 and 8.

FIG. 10 is a partially fragmented edge view of the animal collar shown in FIG. 9.

FIG. 11 is a partially fragmented edge view of the fastening system embodiment of FIGS. 7-10 shown in a closed position.

PRESENTLY PREFERRED EMBODIMENT OF THE INVENTION

The animal collar of the present invention is capable of containing and controllably emitting or releasing a powdered material or substance onto the hair and/or skin of an animal on which the collar is placed. The term "powdered material" as used herein is understood to encompass a single powdered composition as well as a mixture of powdered compositions. Any powdered material suitable for use on an animal and meant for distribution on the hair and/or skin of an animal can be contained and dispensed from the collar of the present invention. Generally, the powdered material has a particle size of about 20 microns to about 250 microns. Suitable powdered materials include an active ingredient such as an insecticidal (or ectoparasitical), medicinal, grooming or the like composition as well as combinations thereof. Without limiting the scope of the present invention, the preferred embodiment of the invention will be described in terms of containing an insecticidal or ectoparasictial powder, specifically a powdered material suitable for repelling or killing ectoparasites such as fleas, ticks and the like.

Preferably, the powdered material is composed of a particulate carrier and an effective amount of an active ingredient. Suitable particulate carriers include calcium carbonate, sodium carbonate, tricalcium phosphate, mineral, clay, silica powders or the like. When the active ingredient is an insecticidal or ectoparasitical compound, suitable active ingredients include organophosphates, carbamates, pyrethins, pyrethoids, botanical derivatives or the like. Additionally, the mixture can include an ingredient, such as silicate, to increase the flowability of the powder mixture.

The animal collar of the present invention can have a single compartment within the collar or a plurality of hollow sections or compartments within the collar for holding the powdered material to be emitted by the collar. The length of the individual compartment or compartments can be of any desired length. A plurality of compartments is preferred since the powdered material contained therein is maintained in a predetermined spaced relationship over the length of the collar, and accordingly, around the neck of the animal wearing the collar, providing for an even distribution and emission of the powdered material. Compacting of the powdered material within the collar is avoided by the use of a plurality of compartments.

The presently preferred embodiment of the animal collar for holding and controllably emitting a powdered substance is best shown in FIGS. 1-3. The animal collar is made utilizing a continuous or single piece of flexible sheet material. The flexible sheet material can be any suitable flexible plastic, such as flexible polyvinyl chloride, flexible polyethylene, flexible polypropylene or the like. The flexible sheet material can be transparent, opaque, or colored. Transparent material is generally preferred since a consumer can then determine when all the powdered material has been emitted from the collar simply by viewing the collar.

Referring now to FIG. 1, there is shown one preferred embodiment of the animal collar of the present invention, wherein such collar has a plurality of longitudinally disposed hollow compartments 1 formed therein. A cross seal 3, generally disposed transverse to the longitudinal orientation of the collar, is located between each adjacent pair of longitudinally spaced-apart compartments 3. The cross seals 3 close off the compartments from each other and serve to hold the material contained within each such compartment as separate from material contained within the other compartments. Cross seals 3 have formed therein, holes or slots 5 and tear or cut marks 7. The function of the holes 5 and cut marks 7 is further described below in connection with the collar's fastening means.

The collar has at least one and preferably a plurality of pores or openings 9 located in one or more of the walls of each of the compartments 1. Each pore 9, whether contained in the side walls, top wall or bottom wall of the compartments 1, is formed and positioned along the length of the collar so as to be uniformly in a spaced relationship to one another. In the illustrated embodiment (FIG. 3), a longitudinal row of pores 9 are present in each side wall of each compartment 1 of the collar as well as a longitudinal row of pores 11 in the top walls and a longitudinal row of pores 13 in the bottom walls. In the illustrated embodiment, the several longitudinal rows of pores 9, 11, and 13 are thus shown in 90 degree intervals about the periphery of each compartment 1. It can be appreciated by those skilled in the art that the number of rows of holes or pores that are peripherally spaced about the compartments can be at different intervals, to provide a collar having more, or less, than four rows of holes as desired. The number of pores located in the collar thus can vary in number and position, and can also vary in diameter size, depending upon the particle size and desired emission rate for the powdered material from the collar. Generally, the particulate material has a particle size of about 20 microns to 250 microns. As the diameter size and number of pores are increased, the emission rate will, accordingly, be increased.

The amount of powdered material contained in the collar can range from approximately ½ to 3 ounces depending on the particular formulation of the powdered material and the size of the animal which will be wearing the collar.

The emission of the powdered material from the individual collar compartments 1 is controlled by a number of factors which can be combined in varying relationships to provide for the most effective release of material for a predetermined period of time.

Preferably, the particle size of the powdered material is the same for all animals no matter what the individual animal's size. Not all animals, however, require the use of the same amount of a powdered material, such as a flea repellent, due to the difference in size of the particular animal wearing the collar. The appropriate amount of powder to be used with a particular sized animal is determined, not by the rate of release, but by the number of compartments making up the overall collar. A collar is made in a specified length or lengths so that the collar can be used for a particular size range of animal, for example a small dog, medium dog or large dog.

Prior to placement of the collar on the animal, the consumer will size the collar to the animal's neck and cut off any excess length. At the same time, accordingly, the consumer will be determining the number of compartments and therefore the amount of powdered material which will be emitted from the hollow compartments 1 of the collar onto the animal. The powdered material is then emitted over a predetermined period of time which is controlled by the rate of emission of the powdered material from the collar compartments.

The rate of emission is controlled by a number of interrelated factors. These factors include the number and positioning of the pores in each compartment's walls, the wall thickness of each compartment, the diameter size of each pore, and the degree of elasticity or flexibility of the sheet material utilized to form the collar. The flexibility of the collar is thus one motivating force which causes the powdered material to move out of the individual collar compartments through the pores. Normal movement of the animal wearing the collar causes the collar to flex, forcing the powdered material contained in the collar to move out of the collar compartments through the pores and to be deposited on the animal's hair and/or skin. Accordingly, the more flexible the material used to make the collar, the more the collar will flex and move the powdered material in response to an animal's movement.

One or more of the above factors can be adjusted to determine an appropriate maximum emission or releasability rate in view of the desired period of time for which emission of the powdered material should continue. Preferably, it is desired that the above factors be combined to provide for an emission of material from the collar for a period of from about 4 to about 6 weeks. The pore diameter can preferably be in the range of from 0.005 to 0.025 inches. Presently, it has been found that about 99.9% of a powdered material having a maximum particle size of 250 microns will pass through a pore arrangement equivalent to 60 mesh over a period of from about 4 to about 6 weeks. All mesh sizes discussed herein are of the U.S. Sieve Series unless otherwise indicated. Also, all weight percentages discussed herein are percent by weight unless otherwise indicated. Other embodiments providing a controlled emission of suitable particulate material over a period of from about 4 to about 6 weeks take into consideration the following particulate discharge data:

(a) about 98.5% of a powdered material will pass through the equivalent of 100 mesh when the maximum particle size is 150 microns;
(b) about 85% of a powdered material will pass through the equivalent of 200 mesh when the maximum particle size is 76 microns; and
(c) about 70% of a powdered material will pass through the equivalent of 325 mesh when the maximum particle size is 45 microns.

One preferred method of making the animal collar of the present invention is shown in FIGS. 4, 5 and 6.

A continuous or single piece of flexible sheet material 15 from which the animal collar of the present invention is made, is scrolled on a conventional support 17 (FIG. 4). The thickness of the flexible sheet material is about 0.015 inches to about 0.060 inches and is preferably about 0.030 inches. The flexible sheet material 15 is unrolled and caused to pass under any conventional means capable of forming pores in the flexible sheet material. A laser drill 19 (FIG. 4), which when activated causes a beam 21 to pass through the sheet material 15 to form a smooth walled pore 23 therein, is one preferred pore-forming means. The laser drill 19 is programmed or actuated to form a pore in a predetermined spaced relationship in the flexible sheet material. Following formation of the pores in the sheet material, the sheet material is scrolled onto take-up support 25 from which it can later be unrolled and used to form the body of the collar. Depending on the number and position of the pores to be present in the collar walls, one or more rows of laser drilled pores, disposed generally along the length of the collar, are formed in the flexible sheet material. For those collars having several rows of pores, the rows of pores are formed in a generally parallel relationship so that when the sheet material is folded over upon itself to form the hollow collar, as shown in FIG. 5 and described below, one row of pores is positioned in each wall of the collar, i.e. top wall, bottom wall, and side walls. As will be appreciated by those skilled in the art, the number and positioning of commercially available pore-forming means can effectively be utilized to achieve a desired pore-spacing arrangement. For example, a single moveable drill or a plurality of spaced drills can be used, depending on the desired efficiency and cost.

In forming the tube-like collar (FIG. 5), the drilled flexible sheet material 27 contained on support 25 is unrolled and drawn over a forming shoulder 29. A tube 31, disposed transverse to the forming shoulder 29, is so spaced from the forming shoulder as to enable the flexible sheet material to pass from the forming shoulder 29 onto the tube 31 and to be wrapable around tube 31. Roller means 32, driven by a drive means (not shown), straddle the flexible sheet material and cause the sheet material to be wrapped around the tube 31. The spacing between the driven rollers 32 is adjustable to accomodate tubes of various sizes and different thicknesses of flexible sheet material. The co-action between tube 31 and drive rollers 32 thus causes edge margins 33 and 35 of the flexible sheet material to overlap at region 37 and form a longitudinal seam 38. The longitudinal seam 38 is sealed along the edge margins 33 and 35, utilizing any conventional sealing means, before the sheet material is removed from tube 31. One such conventional edge margin sealing means is the illustrated radio-frequency welder 36. When the plastic material is polyvinyl chloride, the preferred method of forming the longitudinal seam utilizes radio-frequency welding. Material that is to be joined along the edge margins is thus flexible and bondable to itself. Such material, preferably, is also relatively strong and laser-drillable. Further, while it is desirable (as mentioned above) that the flexible material be transparent in certain situations, it is also desirable that certain other flexible materials, to be utilized to make the collar, be opaque so as to absorb ultraviolet radiation. To meet those and other situations, a variety of commercially available flexible materials as well as commercially available edge margin joining devices well known to those skilled in the art are utilizable.

The illustrated sheet material is thus positioned and caused to overlap along its edge margins so that the thus formed tube-like structure has a row of pores positioned at approximately 90 degree intervals about the periphery along the walls of each compartment. While not illustrated, laser drilling the rows of pores at 180 degree intervals about the compartment periphery is currently contemplated. However, it can further be appreciated that forming pores at more closely spaced peripheral intervals (e.g. at 45 degree intervals) may be desirable in certain situations. The relative location of the pores, of course, is primarily determined by the spacing of the pores 23 when the pores are drilled in the sheet material.

A transverse or cross seal 39 is formed by reciprocating radio-frequency welding jaws 41, as shown in FIGS. 5 and 6, after the longitudinal seam 38 has been sealed and the sheet material 27 has been removed from tube 31. The cross seal 39 comprises a solid wall portion formed between the individual compartments 43 (FIG. 6). Cross seals 39 are formed at predetermined intervals along the tube-like structure thereby forming a plurality of hollow sections or individual compartments 43. After the formation of a cross seal 39, a preselected powdered material, such as a flea repellent, is meter-filled (details not shown) through tube 31 into the hollow section formed by the sealed longitudinal seam 38 and cross seal 39 (FIG. 5). Following filling of the hollow section with preselected powdered material, the drive rollers 32, as shown in FIG. 5, move the now-filled section downwardly relative to tube 31 and stop when the yet unsealed end of the now-filled section is located between the welding jaws 41. Then the welding jaws 41 again are caused to come together (FIG. 6) and another cross seal is formed. Accordingly, by alternating the formation of a cross seal and the filling of a hollow with powdered material, a plurality of individual powder filled compartments is provided as shown in FIG. 5. The compartment-containing tubes 47 (FIG. 5) are then cut at intervals across a cross seal 39 at predetermined lengths to provide a collar, such as at every 25 to 30 inches for when the collar is to be used with a dog.

Cross seals 39 have openings 45 and tear or cut marks 57 formed as a part thereof. The cross seal 39, opening 45, and cut mark 57 are all formed simultaneously in the above-described cross seal-forming operation. FIG. 6 thus shows the formation of a cross seal 39 and an opening 45 utilizing radio-frequency welding. The welding method utilized is conducted according to conventionally known means. Holes or openings 45 are used in conjunction with a commercially available fastening means to attach the collar to an animal as more fully described below. The cut marks 57 are used to guide the consumer during the sizing of a collar on the neck of an animal to form an appropriate sized collar length as further described below.

A commercially available fastening means 49 is attached by any suitable means, i.e., adhesion, welding or the like, to one terminal end 53 of the collar (FIG. 7). The fastening means is utilized in conjunction with opening 45 (FIG. 11) which has been formed in cross seal 39 (FIG. 5).

A preferred fastening means is a hook and loop type fastener, such as a velcro-type closure device, consisting of a loop-containing strip portion 51 attached to collar terminal end 53 and a hook-containing strip portion 55 extending out from loop-containing portion 51 (FIGS. 7 and 8). The loop-containing portion 51 is preferably wider than the hook-containing portion 55. As would be obvious to one skilled in the art, the use of hooks on the wider portion and loops on the narrower portion is also possible.

When the collar is to be placed on an animal, the collar is positioned around the animal's neck to determine the appropriate size, i.e. length, for the particular animal. Once the size is determined, the collar is cut or otherwise separated along an appropriate cut mark 57 located in cross seal 39, thereby removing any excess collar length and, as stated above, determining the appropriate amount of powdered material to be emitted in view of the animal's size. When the collar is cut at an appropriate cut mark, a second terminal end 58 (FIG. 11) having hole 45 contained therein is formed. To fasten the collar on the animal, the collar is extended around the neck of the animal and the hook-containing portion 55 is inserted through hole 45. Hook-containing portion 55 is then folded back around and over loop-containing portion 51. Portions 55 and 51 are then pressed together forming a closure as shown in FIG. 11. The terminal ends 53 and 58 are then held together until the consumer reverses the closure process.

As will be apparent to one skilled in the art, various modifications can be made within the scope of the aforesaid description. Such modifications being within the ability of one skilled in the art form a part of the present invention and are embraced by the appended claims.

It is claimed:

1. An animal collar for containing and emitting a powdered material, said collar being made from a single sheet of flexible material, comprising a plurality of compartments holding said powdered material, said compartments having a plurality of pores formed through at least one wall of each of said compartments, wherein said powdered material is emitted through said plurality of pores onto an animal on which said animal collar is placed.

2. The animal collar according to claim 1 wherein said single sheet of flexible material is selected from the group consisting of polyvinyl chloride, polypropylene and polyethylene.

3. The animal collar according to claim 1 wherein said pores are formed by laser drilling.

4. The animal collar according to claim 1 wherein a cross seal having an opening therein suitable for receiving a fastening means is located between said hollow compartments.

5. The animal collar according to claim 4 wherein said fastening means has a hook-containing portion attached to one of said hollow compartments and a loop-containing portion extending from said hook-containing portion, wherein said hook-containing portion is capable of extending through said opening in said cross seal and back over said loop-containing portion where said hook-containing and loop-containing portions are secured to each other.

6. The animal collar according to claim 1 wherein said pores have a diameter in the range of from about 0.005 to about 0.025 inches.

7. The animal collar according to claim 1 wherein said powdered material has a particle size in the range of from about 20 microns to about 250 microns.

8. The animal collar according to claim 1 wherein said powdered material contains an active ingredient selected from the group consisting of insecticidal, ectoparasitical, medicinal, and animal grooming compositions.

9. The animal collar according to claim 8 wherein said powdered material additionally contains a particulate carrier.

10. The animal collar according to claim 1 wherein said single sheet of flexible material has a thickness in the range of from about 0.015 to about 0.060 inches.

11. An animal collar for containing and emitting a powdered material made from a single sheet of flexible material comprising at least one compartment holding said powdered material, said compartment or compartments having a plurality of pores formed in at least one wall of each of said compartment or compartments, said pores being formed by laser drilling, wherein said powdered material is emitted through said plurality of pores from said collar onto an animal on which said collar is placed.

12. The animal collar according to claim 11 wherein said single sheet of flexible material is selected from the group consisting of polyvinyl chloride, polyethylene, and polypropylene.

13. The animal collar according to claim 11 wherein said pores have a diameter in the range of from about 0.005 to about 0.025 inches.

14. The animal collar according to claim 11 wherein said powdered material has a particle size of from about 20 to about 250 microns.

15. The animal collar according to claim 11 wherein said powdered material contains an active ingredient selected from the group consisting of insecticidal, ectoparasitical, medicinal, and animal grooming compositions.

16. The animal collar according to claim 15 wherein said powdered material additionally contains a particulate carrier.

17. The animal collar according to claim 11 wherein said single sheet of flexible material has a thickness in the range of from about 0.015 to about 0.060 inches.

18. The animal collar according to claim 11 wherein a cross seal having an opening therein suitable for receiving a fastening means is located between said hollow compartments.

19. The animal collar according to claim 18 wherein said fastening means has a hook-containing portion attached to one of said hollow compartments and a loop-containing portion extending from said hook-containing portion, wherein said hook-containing portion is capable of extending through said opening in said cross seal and back over said loop-containing portion where said hook-containing and loop-containing portions are secured to each other.

20. A method of making an animal collar which controllably emits a powdered material contained within said collar comprising:
   (a) laser drilling at least one row of pores through a single sheet of flexible material along the longitudinal axis of said flexible material;
   (b) drawing said flexible material of step (a) along said longitudinal axis around a tube causing the parallel longitudinal edge margins of said flexible material to overlap and form a tube-like structure;
   (c) sealing said overlapping longitudinal edge margins to form a longitudinal seam in said tube-like structure;
   (d) forming a cross seal across the width of said tube-like structure having said sealed longitudinal seam;
   (e) causing a powdered material to flow into said tube-like structure subsequent to the formation of said cross seal;
   (f) alternately repeating steps (d) and (e) a plurality of times; and
   (g) after the formation of a plurality of said cross seals, cutting said tube-like structure across one of said cross seals to provide said animal collar.

21. The method according to claim 20 wherein said cross seal of step (d) is formed by radio-frequency welding.

22. The method according to claim 20 wherein said flexible material is selected from the group consisting of polyethylene, polypropylene, and polyvinyl chloride.

23. The method according to claim 20 wherein the diameter of said pores is in the range of from about 0.005 to about 0.025 inches.

24. The method according to claim 20 wherein a fastening means is attached to one terminal end of said animal collar of step (g), and said cross seal of step (d) has an opening formed therein which is suitable for receiving said fastening means.

25. The method according to claim 24 wherein said fastening means has a hook-containing portion attached to said terminal end and a loop-containing portion extending from said hook-containing portion, wherein said hook-containing portion is capable of extending through said opening in said cross seal and back over said loop-containing portion where said hook-containing and loop-containing portions are secured to each other.

26. The method according to claim 20 wherein said powdered material has a particle size in the range of from about 20 to about 250 microns.

27. The method according to claim 20 wherein said powdered material contains an active ingredient selected from the group consisting of insecticidal, ectoparasitical, medicinal, and animal grooming compositions.

28. The method according to claim 27 wherein said powdered material additionally contains a particulate carrier.

29. The method according to claim 20 wherein said flexible material has a thickness in the range of from about 0.015 to about 0.060 inches.

* * * * *

UNITED STATES PATENT AND TRADEMARK OFFICE
CERTIFICATE OF CORRECTION

PATENT NO. : 4,900,876

DATED : February 13, 1990

INVENTOR(S) : Bushman et al.

It is certified that error appears in the above-identified patent and that said Letters Patent is hereby corrected as shown below:

At column 3, line 36, please change "ectoparasictial" to
-- ectoparasitical --.

At column 6, lines 39-40, please change "accomodate" to
-- accommodate --.

In claim 25, at column 10, line 35, please change "through," to
-- through --.

Signed and Sealed this

Nineteenth Day of February, 1991

Attest:

HARRY F. MANBECK, JR.

*Attesting Officer*  *Commissioner of Patents and Trademarks*